*H. W. Hasslock,*

*Cultivator.*

No. 101,010. Patented Mar. 22. 1870.

Witnesses:
M. Vorlunder
Prof. Brooks

Inventor:
H. W. Hasslock
per Munn & Co.
Attorneys.

UNITED STATES PATENT OFFICE.

HERMANN W. HASSLOCK, OF NASHVILLE, TENNESSEE.

IMPROVEMENT IN HORSE-HOES.

Specification forming part of Letters Patent No. 101,010, dated March 22, 1870.

*To all whom it may concern:*

Be it known that I, H. W. HASSLOCK, of Nashville, in the county of Davidson and State of Tennessee, have invented a new and useful Improvement in Horse-Hoes; and I do hereby declare that the following is a full, clear, and exact description thereof, which will enable others skilled in the art to make and use the same, reference being had to the accompanying drawings, forming part of this specification, in which—

Figure 1:
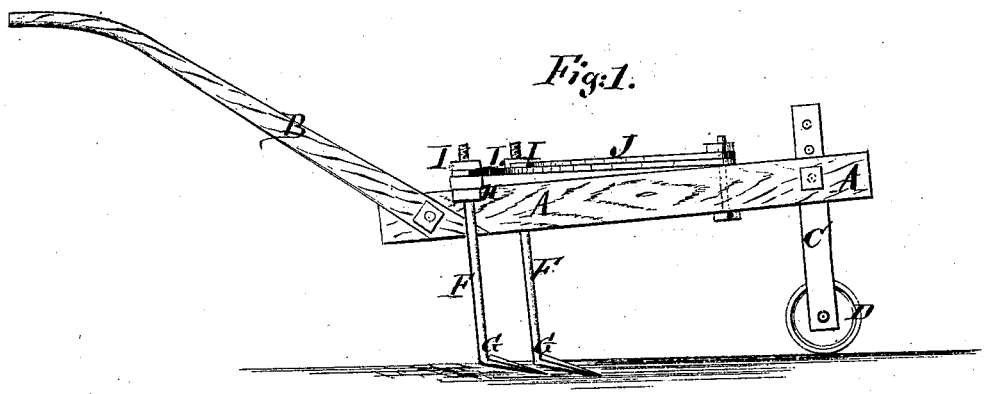
Figure 2:
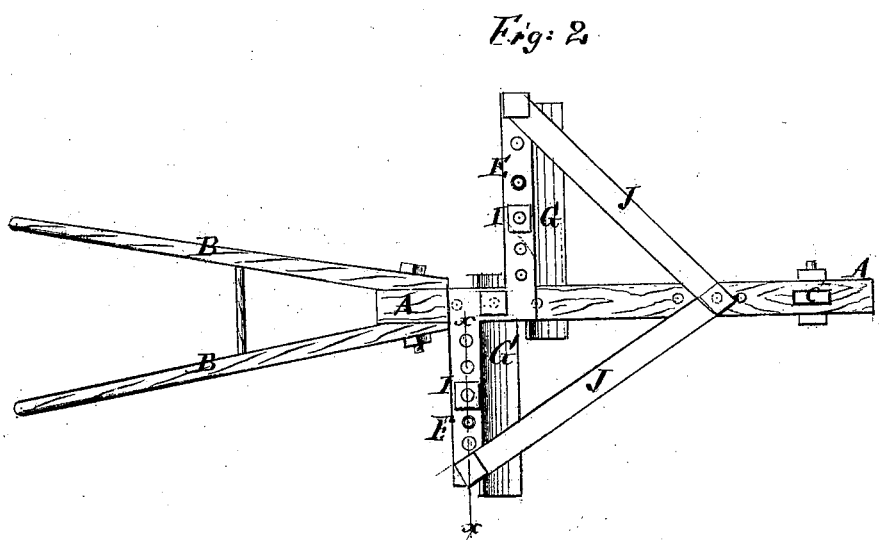
Figure 3:
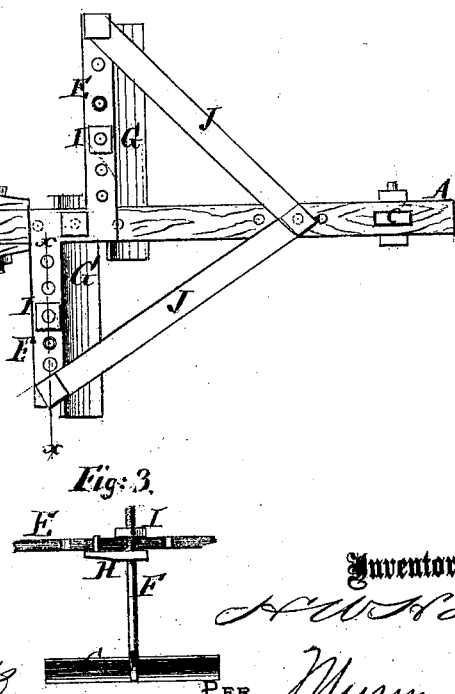

Figure 1 is a side view of my improved horse-hoe. Fig. 2 is a top view of the same. Fig. 3 is a detail sectional view of the same, taken through the line $x\ x$, Fig. 2.

Similar letters of reference indicate corresponding parts.

My invention has for its object to furnish an improved horse-hoe for cutting up the grass and weeds about cotton, corn, and other plants planted in rows or drills, and which shall at the same time be simple in construction and effective in operation, leaving the soil thoroughly loosened; and it consists in the construction and combination of the various parts of the machine, as hereinafter more fully described.

A is the plow-beam, to the rear end of which the handles B are attached in the ordinary manner.

C is a standard, to the lower end of which is pivoted a wheel, D, and the upper end of which passes up through a hole in the forward end of the beam A, where it is secured in place by a bolt passing through a hole in the forward end of the beam A and through one or the other of the holes in the upper part of the said standard C, so that the machine may be conveniently adjusted to work deeper or shallower in the ground, as may be desired.

E is a cross-bar, which is securely bolted at its central point to the rear part of the beam A. The bar E is made with an offset in its middle part, as shown in Fig. 2, so that its arms may be parallel with each other, but not in the same line.

F are standards, to the lower ends of which are attached, or upon them are formed, the plates, hoes, or knives G, which are set at about an angle of twenty degrees, (20°.) The ends of the standards F may be connected with the hoes G at or near the centers, or at or near the ends of the said hoes G, as may be desired, or according as the character of the plants to be cultivated may require. The upper ends of the standards F pass up through holes in the arms of the cross-bar E, and have screw-threads cut upon them to receive the nuts H I. The nuts H are placed upon standards F beneath the bar E, are made long, and have an upwardly-projecting pin attached to them in such a position as to enter the hole in the arms of the bar E next to the one in which the standard R is placed, to prevent the said nut from turning when the nut I, which is placed upon the standard F above the bar E, is turned. Several holes are made in the arms of the bar E to receive the standards F, so that the said standards may be placed farther apart or closer together, according to the distance apart of the rows of plants being cultivated. The draft-strain upon the arms of the bar E is sustained by the brace-bars J, the rear ends of which are bolted to the ends of the bar E, and the forward ends of which are bolted to the forward part of the beam A, as shown in Figs. 1 and 2. Several holes are formed in the beam A, for the bolts that secure the cross-bar E and the forward ends of the brace-bars J to said beam, so that the hoes may be adjusted farther forward or farther back upon said beam, as may be desired.

Having thus described my invention, I claim as new and desire to secure by Letters Patent—

The combination of the cross-bar E, standards F, hoes or knives G, nuts H I, braces J, wheel D, and adjustable standard C, with each other and with the plow-beam A and handles B, substantially as herein shown and described, and for the purpose set forth.

H. W. HASSLOCK.

Witnesses:
G. WATERMAN,
L. T. CUNNINGHAM.